(12) United States Patent
Dosani et al.

(10) Patent No.: US 6,529,591 B1
(45) Date of Patent: Mar. 4, 2003

(54) METHOD AND SYSTEM FOR COMMUNICATION CALLER IDENTIFICATION INFORMATION BETWEEN A REMOTE SITE AND A CENTRAL MONITORING STATION OVER PSTN

(76) Inventors: Nazir Dosani, 8 Harris Way, Thornhill, Ontario (CA), L3T 5A7; Nizar Ladha, 192 Harrison Drive, New Market, Ontario (CA), L3Y 4B6

( * ) Notice: Subject to any disclaimer, the term of this patent is extended or adjusted under 35 U.S.C. 154(b) by 0 days.

(21) Appl. No.: 09/744,615
(22) PCT Filed: Jul. 30, 1999
(86) PCT No.: PCT/CA99/00689
§ 371 (c)(1), (2), (4) Date: Jan. 25, 2001
(87) PCT Pub. No.: WO00/08839
PCT Pub. Date: Feb. 17, 2000

(30) Foreign Application Priority Data

Jul. 31, 1998 (CA) .............................................. 2242272
Oct. 20, 1998 (CA) .............................................. 2249711

(51) Int. Cl.[7] ........................ H04M 11/00; H04M 11/04
(52) U.S. Cl. ............................ 379/106.03; 379/102.01; 379/49
(58) Field of Search ........... 379/37–51, 102.01–106.11, 379/142.01, 142.06, 142.07, 93.24–93.26

(56) References Cited

U.S. PATENT DOCUMENTS

| 4,766,548 A | * | 8/1988 | Cedrone et al. ............. 379/102 |
| 5,412,708 A | * | 5/1995 | Katz ..................... 379/102.01 |
| 5,682,422 A | * | 10/1997 | Oliver ......................... 379/107 |
| 6,031,894 A | * | 2/2000 | Fleming, III ................. 379/44 |
| 6,061,430 A | * | 5/2000 | Miller et al. ................... 379/49 |

* cited by examiner

*Primary Examiner*—Wing Chan

(57) ABSTRACT

A system (10, 100) for communicating information and caller identification between entities (11, 13) over a public switched telephone network (PSTN) (20) includes at least one remote site (11) including a device (14, 115, 117) whose status is to be monitored. The remote site is coupled to the PSTN (20) and is operable to make a call when the device status is to be determined. A monitoring station (13) includes a plurality of call receiving interfaces (26) coupled to the PSTN (20) and a processor (30) coupled to the call receiving interfaces (26). Each call receiving interface (26) is assigned a different telephone number corresponding to information concerning the status of the device. Each call receiving interface (26) conveys caller identification data received from the PSTM (20) and call receiving interface identification data to the processor (30) in response to a call received from the remote site (11) over the PSTN to allow the processor to determine the status of the device and its location without requiring the call to be answered.

18 Claims, 3 Drawing Sheets

METHOD AND SYSTEM FOR COMMUNICATION CALLER IDENTIFICATION INFORMATION BETWEEN A REMOTE SITE AND A CENTRAL MONITORING STATION OVER PSTN

TECHNICAL FIELD

The present invention relates to communications and in particular to a method and system for passing information and caller identification between independent parties over a public switched telephone network.

BACKGROUND ART

Public switched telephone networks (PSTNs) have been commonly used to establish telephone calls between communicating parties. With the advent of modems, PSTNs have also been used to allow electronic equipment at remote sites, such as for example, security panels, vending machines, environment monitoring systems, meters, and load management systems, to send information to a central location or clearing house.

Currently, in the latter case, when electronic equipment at a remote site is to send information to the central location, the modem at the remote site, goes off-hook and dials the telephone number assigned to the central location. When the call is answered, the electronic equipment at the remote site sends the information electronically over the PSTN to the central location. Once the information has been sent, the modem at the remote site hangs up to terminate the call.

Typically, the central location receives information from electronic equipment at a significant number of remote sites. Often, a plurality of remote sites call into the central location at the same time. In order to handle multiple calls, the central location is connected to the PSTN via a number of telephone lines, each having an associated modem and telephone number. If a modem at a remote site dials the telephone number assigned to one of the modems at the central location and a busy signal is received, the modem at the remote site hangs up and tries the telephone number assigned to another one of the modems.

In some countries, call charges apply whenever a remote modem makes a connection with a modem at a central location. Also, long-distance charges may apply if the central location is situated in a different geographical location than the remote site initiating the call. Even though electronic equipment at remote sites often send short information messages, telephone charges can still be substantial if the messages are sent on a regular basis, and especially if the messages are sent over a wireless communication network.

Security systems for both residential and commercial applications have gained wide acceptance and central monitoring of such security systems is typically recommended. As a result, many security systems connect to a central monitoring station over a PSTN when an alarm condition arises to relay the alarm information to the central monitoring station.

Security systems of this nature typically include a number of sensors to monitor the area under surveillance. The sensors communicate with an on-site alarm panel that acts as a central source for the sensors. The alarm panel connects to the central monitoring station over a PSTN when an alarm condition occurs, and relays the sensor information to the central monitoring station. The central monitoring station in turn processes the sensor information and based on the processed information, takes or initiates certain predetermined steps. These steps may include producing an operator report and/or contacting the local police department, fire department or private security personnel. Of course, the steps to take in response to sensor information can vary depending on the needs of the customer, the owner of the alarm panel and/or the assessment of the alarm condition made by the operator at the central monitoring station.

In modern PSTNs, caller line identification (CLI) data is often transmitted to locations receiving incoming calls. CLI data is particular to each subscribed telephone service and typically contains the telephone number of the calling party, alpha-numeric identification of the calling party, and the time and date of the call. Of course, other information may also be provided. Security systems, which use CLI data accompanying a call, have been considered.

For example, U.S. Pat. No. 5,511,109 to Hartley et al discloses a security system using call display. The security system includes a plurality of alarm panels, each of which is associated with a plurality of sensors. The alarm panels are connected to a PSTN via telephone lines. A receiving arrangement is connected to the PSTN and recognizes calls generated by the alarm panels. The receiving arrangement is also connected to a central computer. When an alarm panel generates a call in response to an alarm condition as detected by one or more of its associated sensors, the PSTN supplies CLI data identifying the calling alarm panel. The receiving arrangement in turn answers the call allowing the alarm panel to send alarm information to the central computer. The CLI data supplied by the PSTN together with the alarm information received from the alarm panel is used by the central computer to determine the steps to take in response to the alarm condition. Unfortunately, this security system can be costly to customers if long distance telephone charges apply to the call made by the alarm panel or if the call made by the alarm panel is carried out over a wireless communication network where airtime charges apply.

Canadian Patent Application No. 2,214,525 to Drysdale et al discloses a system for monitoring the integrity of a telephone connection between an alarm system and a central location established over a PSTN. The alarm system includes a digital communicator for establishing a call to the central location at predetermined intervals or in response to polls made by the central location. If no alarm condition exists when a call is to be made to the central location, the digital communicator drops the call after CLI data has been transmitted to the central location. This allows the central location to confirm the integrity of the telephone connection to the alarm system without having to answer the call. If an alarm condition exists when a call is to be made to the central location, the digital communicator maintains the call. When the call is answered by the central location, alarm information is transmitted to the central computer. As will be appreciated, during an alarm condition, a telephone call is established between the alarm system and the central location. Thus, long distance telephone charges may apply to the call made by the alarm system. Also, if the call made by the alarm system is carried out over a wireless network, airtime charges may apply.

Furthermore, regulations often require security systems to be tested on a regular basis. In the case of the Hartley et al and Drysdale et al systems described above, this requires a telephone connection to be established between the alarm systems and the central locations. If long distance charges apply or if wireless communication network airtime charges apply, costs are added to the ownership of the alarm systems.

It is therefore an object of the present invention to obviate or mitigate the above-identified disadvantages.

DISCLOSURE OF THE INVENTION

According to one aspect of the present invention there is provided a monitoring station to monitor the status of at least one remote site over a public switched telephone network (PSTN), said monitoring station comprising:

a plurality of call receiving interfaces to receive calls from said at least one remote site over said PSTN and accompanying caller identification data, each call receiving interface having a telephone number corresponding to specific information to be conveyed from said at least one remote site to said monitoring station; and a processor in communication with said call receiving interfaces, said processor receiving call receiving interface identification data and caller identification data in response to calls received by said call receiving interfaces to allow said processor to receive specific information from said at least one remote site and its identity without requiring said call receiving interfaces to answer the calls.

Preferably, the caller identification data is caller line identification (CLI) data generated by the PSTN. In one embodiment, the at least one remote site includes a plurality of sensors, each of the sensors being assigned a unique number. In this case, selected call receiving interfaces have telephone numbers incorporating the numbers of particular sensors so that calls received by each selected call receiving interface from the at least one remote site in response to sensor output, identify the sensor responsible for the calls. CLI data accompanying the calls identifies the location of the sensors.

In another embodiment, the at least one remote site includes at least one meter for measuring a utility consumption and storing a meter reading. In this case, selected call receiving interfaces have telephone numbers with digits representing digits of the meter reading and digit values so that calls received by selected call receiving interfaces from the at least one remote site identify meter reading digits and values. CLI data accompanying the calls identifies the location of the at least one meter.

Prefereably, the processor polls a database storing information concerning actions to be performed in response to calls received by the call receiving interfaces. In one form, the processor is a computer. The monitoring station further includes a display coupled to the computer for displaying CLI data received from the call receiving interfaces as well as information read from the database. It is also preferred that the monitoring station further includes a printer coupled to the computer for printing the CLI data and information read from the database in response to calls received from the call receiving interfaces.

According to another aspect of the present invention there is provided a system for communicating information and caller identification between entities over a public switched telephone network (PSTN) comprising:

at least one remote site including a device whose status is to be monitored, said remote site being coupled to said PSTN and being operable to make a call when the device status is to be determined; and a monitoring station including a plurality of call receiving interfaces coupled to said PSTN and a processor coupled to said call receiving interfaces, each call receiving interface being assigned a different telephone number corresponding to information concerning the status of said device, each call receiving interface conveying caller identification data received from said PSTN and call receiving interface identification data to said processor in response to a call received from said remote site over said PSTN to allow said processor to determine the status of said device and its location without requiring said call to be answered.

According to still yet another aspect of the present invention there is provided a method for monitoring the status of a device at a remote location over a public switched telephone network (PSTN) comprising the steps of:

determining the status of said device and using the status to generate a telephone number;

dialing said telephone number to make a call over said PSTN, said telephone number corresponding to a specific call receiving interface of a monitoring station;

dropping the call after a sufficient number of ringing signals have been received by said specific call receiving interface to ensure deliver of caller identification data to said call receiving interface by said PSTN; and processing the caller identification data and call receiving interface identification data to determine the location and status of said device without requiring the call to be answered.

According to still yet another aspect of the present invention there is provided a method for conveying the status of a device at a remote location over an Internet connection to a monitoring station comprising the steps of:

determining the status of said device at said remote location and using the status to generate an electronic mail (e-mail) address leader;

generating an e-mail address by appending said leader to the site address assigned to said monitoring station;

dispatching an e-mail message to said monitoring station including said e-mail address and a return address assigned to said remote location; and processing the e-mail message by examining the e-mail address leader to determine the status of said device and the return address to determine the location of said device.

The present invention provides advantages in that information can be sent and received between entities over a PSTN with incurring long distance or airtime charges. In addition, information can be transmitted over an Internet connection in an manner which limits the amount of power and memory required to process the information.

BRIEF DESCRIPTION OF THE DRAWINGS

Embodiments of the present invention will now be described more fully with reference to the accompanying drawings in which.

BEST MODES FOR CARRYING OUT THE INVENTION

The present invention relates to communications between two independent systems over a public switched telephone network (PSTN). Identification information accompanying a call made by one of the independent systems to the other is used by the independent system receiving the call so that appropriate action can be taken and without requiring the called independent system to answer the call. As a result, long-distance and/or airtime charges are avoided. Although the present invention is of general application, preferred embodiments of the present invention in relation to security systems will now be described for ease of understanding.

Figure 1:
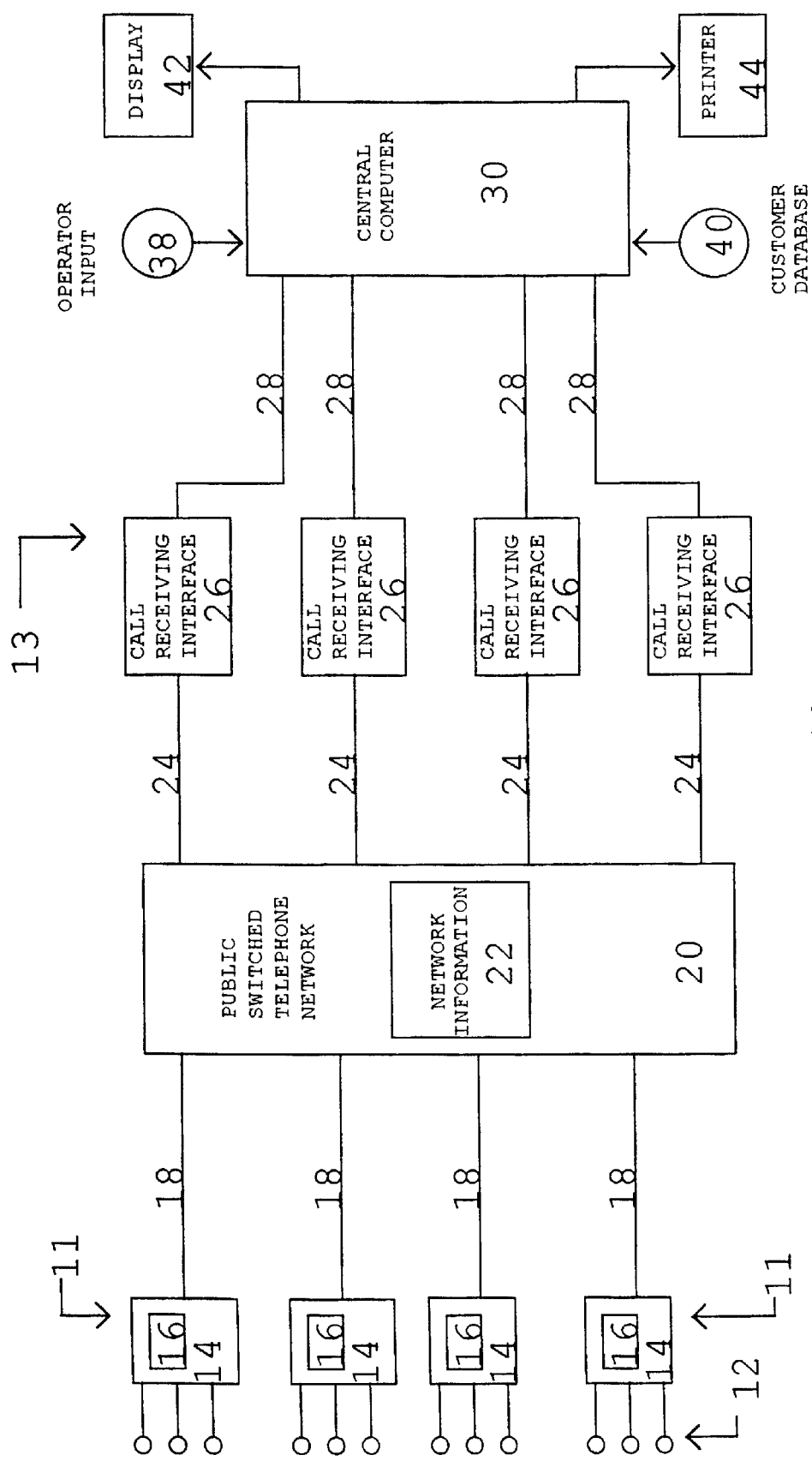
FIG. 1 is a schematic block diagram of a security system in accordance with the present invention.
Figure 2:
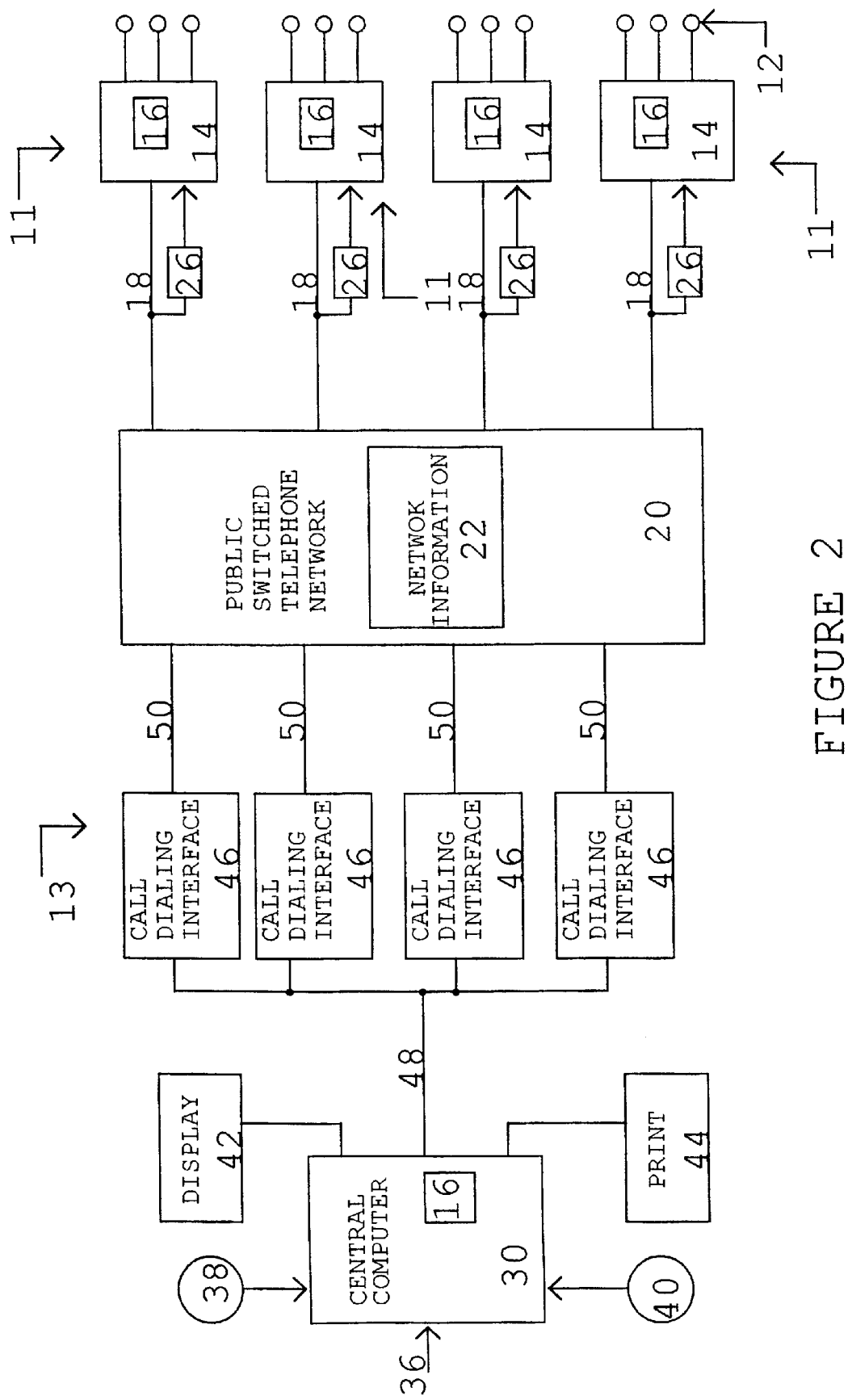
FIG. 2 is another schematic block diagram of the security system of FIG. 1.

Turning now to FIGS. 1 and 2, a security system in accordance with the present invention is shown and is generally indicated to by reference numeral 10. Security system 10 is designed to monitor one or more locations or premises 11 (hereinafter referred to as "locations") and generate calls to a remote monitoring station 13 in response to alarm conditions. As can be seen in FIG. 1, security system in this embodiment includes a plurality of alarm panels 14, each of which is associated with a particular location 11 to be monitored. A plurality of sensors 12 are connected to each of the alarm panels 14. The sensors 12 connected to each alarm panel 14 monitor the associated location 11 and provide information to the alarm panel concerning the status of the monitored location. Each sensor 12 is assigned a unique sensor number XY that is stored in memory (not shown) within the alarm panel 14.

The alarm panel 14 is connected to a public switched telephone network (PSTN) 20 via a telephone channel 18 and includes a modem (not shown) to dial a telephone number in response to an alarm condition, a ring tone detector 16 such as that manufactured by Teltone under part No. M980 or M981 to detect ring back tones generated by the PSTN 20 and a call receiving interface 26 to receive calls received from the PSTN 20 (see FIG. 2). The alarm panel 14 also stores a partial telephone number 123 456 78xy that is completed using sensor numbers XY to generate calls to the central monitoring station 13 in response to an alarm condition as will be described.

PSTN 20 includes a computer 22, which forwards caller line identification (CLI) data to called parties thereby to identify the calling parties. PSTN 20 may be a landline communication network, a wireless or cellular communication network or a combination of landline and wireless communication networks.

The central monitoring station 13 includes a plurality of call receiving interfaces 26, each of which is connected to the PSTN 20 via a telephone channel 24. Each call receiving interface 26 has a unique telephone number that is associated with a particular sensor number. The call receiving interfaces 26 are connected to a computer 30 via communication channels 28. Computer 30 is responsive to operator input 38 and communicates with a customer database 40. Computer 30 also provides output to a display 42 and to a printer 44.

As can be seen in FIG. 2, computer 30 also includes a ring tone detector 16 and communicates with a plurality of call dialing interfaces 46 over communication channels 48. Each call dialing interface 46 has an associated telephone number whose last two digits represent a different action code as will be described.

The security system 10 is designed to notify the central monitoring station 13 when alarm conditions are detected by the sensors 12. CLI data accompanying the calls is conveyed to the computer 30 at the central monitoring station via the PSTN 20 to enable appropriate action to be taken without requiring the calls to be answered. Specifics of the security system operation will now be described further.

During operation, when a sensor 12 detects an alarm condition, an alarm signal is sent to the associated alarm panel 14. In response to the sensor alarm signal, the alarm panel 14 determines the sensor number XY and appends the sensor number to the partial telephone number stored therein to complete the telephone number 123 456 78XY. The completed telephone number corresponds to the telephone number of the call receiving interface 26 that is associated with the triggered sensor 12. At this time, the alarm panel 14 causes its modem to dial the completed telephone number 123 456 78XY thereby to generate a call.

PSTN 20 upon receiving the call from the alarm panel 14, directs the call to the appropriate call receiving interface 26 and notifies the alarm panel 14 by returning ring back tones corresponding to ringing signals received by the call receiving interface 26. The PSTN 20 also conveys CLI data to the call receiving interface 26 after the first ringing signal is received by the call receiving interface 26. The CLI data includes the telephone number assigned to the location 11 at which the alarm panel 14 is located.

The ring tone detector 16 in the alarm panel 14 monitors the telephone channel 18 to detect the ring back tones generated by the PSTN 20. The alarm panel 14 counts the number of ring back tones and terminates the call after a sufficient number of ring back tones have been received to ensure delivery of the CLI data to the call receiving interface 26. In this manner, the call receiving interface 26 receives CLI data identifying the location of the tripped sensor 12 without requiring a telephone connection between the alarm panel 14 and the call receiving interface 26 to be established.

When the call receiving interface 26 receives the call and accompanying CLI data from the PSTN 20, the call receiving interface 26 extracts and interprets the CLI data in a conventional fashion. The call receiving interface 26 then generates an electronic data signal corresponding to the CLI data and combines this electronic data with data identifying itself for forwarding to the computer 30 at the central monitoring station 13 for further processing. Thus, computer 30 is informed of the location of the tripped sensor 12 by virtue of the CLI data and the identity of the tripped sensor by virtue of the call receiving interface identification data. If desired, the call receiving interface 26 can include a display (not shown) to display CLI data immediately upon receipt.

After the call receiving interface 26 has combined the CLI data and its identification data, the data is immediately conveyed to the computer 30. Computer 30 processes the data to identify the location where the alarm condition exists and the nature of the alarm condition. This information is then presented on display 42 and printed via printer 44. Computer 30 also polls the customer database 40 to determine the steps to be carried out in response to the alarm condition. These instructions can also be presented on display 42 and printed via printer 44.

Sabotage of the computer 30 at the central monitoring station 13 can occur by flooding of the call receiving interfaces 26 with false calls. Since the call receiving interfaces 26 pass the CLI data to the computer 30, which compares the CLI data with the customer database 40, calls from external telephone sources are detected. In this case, an attempt to sabotage can be assumed and the external telephone source can be identified by its CLI data.

The computer 30 at the central monitoring station 13 can also transmit codes to the alarm panels 14 via the PSTN 20. The codes represent instructions for the alarm panels to perform desired actions. In this embodiment, the codes are represented by two digits and include a "reset" sensor code and a "re-dial" telephone number code.

When a code is to be transmitted to an alarm panel 14, the computer 30 selects a call dialing interface 46 having a telephone number whose last two digits represent the desired code to be transmitted. The computer 30 then instructs the call dialing interface 46 to dial the telephone number of the location 11 at which the alarm panel 14 is located. In response, the call dialing interface 46 dials the telephone number. The PSTN 20 in turn directs the call to the call receiving interface 26 at the location 11 together with CLI data identifying the call dialing interface 46 in the same manner described previously. The call receiving interface 26 in turn extracts and interprets the last two digits of the CLI data. The last two digits of the CLI data, which represent the code, cause the alarm panel 14 to take the necessary action corresponding to the code, such as reset a tripped sensor or re-dial the telephone number of the call receiving interface 26.

In order to set up the security system 10, during installation, the alarm panels 14 complete installation communication routines so that CLI data generated by the PSTN 20 is matched properly to the individual sensors 12. During installation, the customer database 40 is also completed so that appropriate steps are taken in response to alarm conditions.

Since the CLI data is generated by the PSTN 20, the information it provides concerning the location of the tripped sensors is accurate and is not subject to alarm panel installation errors or purposeful corruption at the alarm panel locations. Also, since CLI data is used to identify the alarm condition location, problems associated with transmission of data signals such as noise, cross-talk, sabotage or other errors are mitigated.

As will be appreciated, with a PSTN 20, the alarm panels 14 may be moved by the owner without great concern since the CLI data generated by the PSTN 20 identifies the current locations of the alarm panels 14.

If desired, the ring tone detectors 16 can be conditioned to detect "line busy" and "reorder" tones generated by the PSTN 20 in response to calls, which cannot be completed. In this case, the alarm panels 14 interpret these tones as error indicators and maintain error logs.

Also, if desired, the alarm panels 14 may also be programmed with the telephone number of a call receiving interface 26 designed to answer calls from the alarm panels 14 and maintain an on-line connection to the computer 30. In this manner, the computer 30 can test the alarm panels 14, remotely program the alarm panels 14 and/or monitor the locations 11. In this case, the alarm panels 14 respond to a code received from a call dialing interface 46, which causes the alarm panels 14 to dial the telephone number of the call receiving interface 26.

Figure 3:
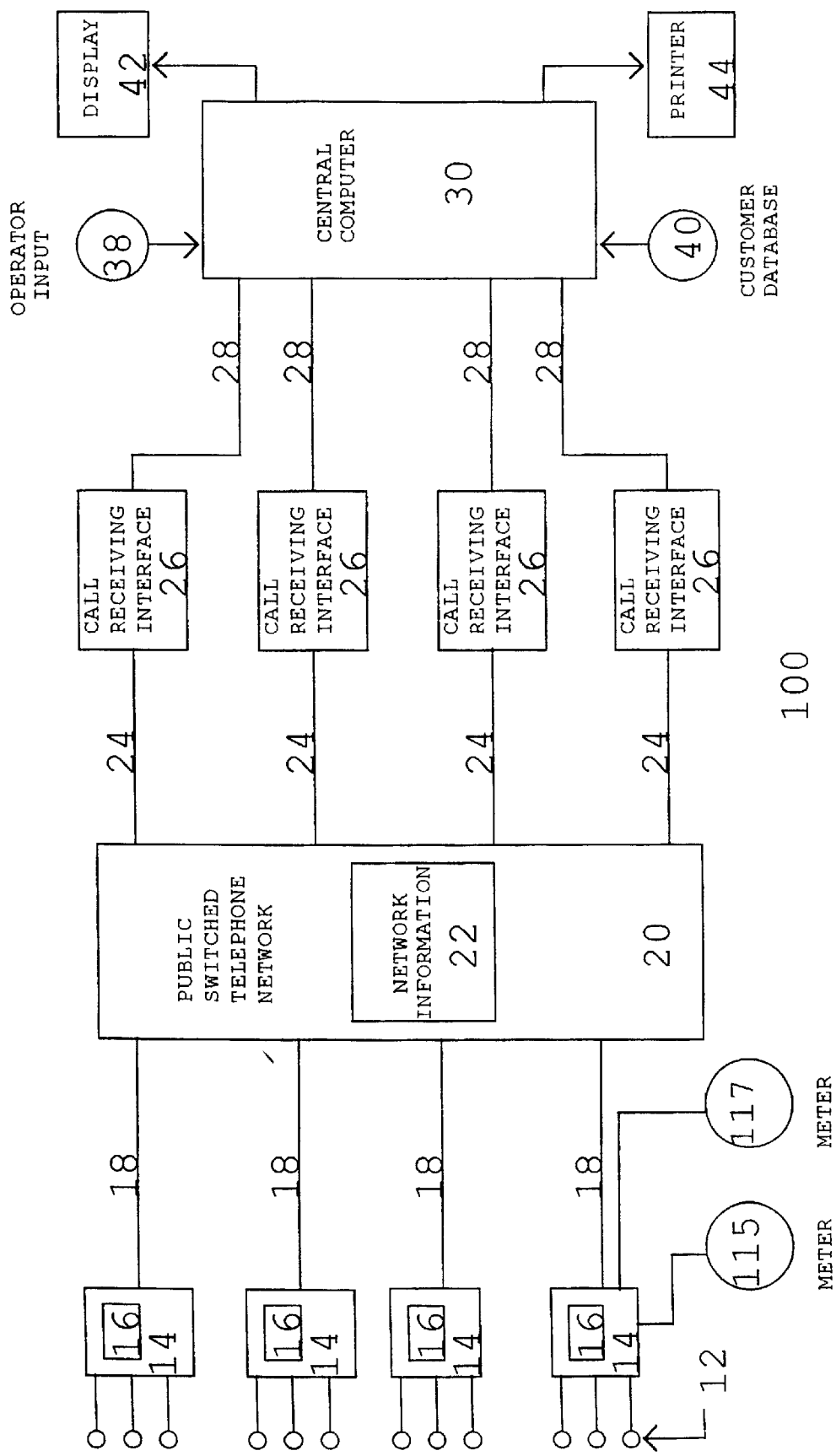
FIG. 3 is a schematic block diagram of an alternative embodiment of a security system in accordance with the present invention.

Turning now to FIG. 3, another embodiment of a security system in accordance with the present invention is shown and is generally indicated to by reference numeral 100. The security system 100 of this embodiment is very similar to that of the previous embodiment. However, in this embodiment, meters 115 and 117 for monitoring utility consumptions and storing meter readings are also connected to the alarm panel 14.

The meters 115 and 117 can be read either in response to a code received from a call dialing interface 46 or at predetermined intervals. When a meter is to be read, the associated alarm panel 14 reads the meter and saves the read meter data in memory therein. The read meter data can be the current meter value, the peak demand, the difference between the current meter value and the last read meter value etc. If desired, the alarm panel may compress the read meter data using any conventional compression algorithm.

Similar to the previous embodiment, some of the call receiving interfaces 26 have unique telephone numbers associated with particular sensor numbers. However, in this case, some of the call receiving interfaces 26 have unique telephone numbers associated with a particular digit of a meter value.

Thus, when an alarm panel 14 reads a meter either in response to a received code or at a predetermined interval, the alarm panel 14 completes a list of telephone numbers using the read meter data. The second last digit of each telephone number identifies a specific digit of the read meter data while the last digit of the telephone number identifies the actual value of the digit. Once the list of telephone numbers is completed, the alarm panel 14 generates a series of calls to call receiving interfaces 26 and drops each call after the PSTN 20 has forwarded the CLI data. As a result, the identities of the call receiving interfaces 26 receiving the calls and the accompanying CLI data identify the meter and its read meter data. Thus, all of this information can be transmitted by an alarm panel 14 to the central monitoring station 13 without requiring the calls to be answered. The call receiving interfaces 26 extract the read meter data and convey this data with the CLI data to the computer 30 for processing.

Although the call receiving interfaces 26 and computer 30 are shown separately, those of skill in the art will appreciate that they may be combined into a single unit. Also, as will be appreciated, the CLI data provided by the PSTN 20 may vary. The exact information provided by the CLI data is not significant since the present system uses the information simply to identify the calling party.

In yet another embodiment, electronic mail (e-mail) may be used by the alarm panels 14 and computer 30 to transmit messages over an Internet connection. As is well known to those of skill in the art, electronic equipment equipped with e-mail capabilities are assigned site addresses of the form @xxxx.yy(y). Any e-mail message having a site address corresponding to that assigned to electronic equipment will be delivered to the electronic equipment regardless of the characters in front of the site address. It is up to the electronic equipment to decode the characters in front of the site address.

Accordingly, in the security system according to the present invention, the alarm panels 14 can be configured to send e-mail messages to the computer 30 to notify the computer 30 of an alarm condition or a read meter value. In this case, the characters in front of the site address of the computer 30 identify the tripped sensor or read meter value while the return e-mail address identifies the location 11. Since only the e-mail address fields are used to convey information to the computer 30, processing power and memory requirements are significantly reduced as compared to systems which use message fields to convey information. Of course, the computer 30 can also use e-mail messages to convey action codes to the alarm panels 14.

Although the present invention has been described with specific reference to security systems, those of skill in the art will appreciate that the present invention may be used in virtually any environment where information from a remote site needs to be sent to a monitoring location. For example, the present invention may be incorporated into vending machines to allow inventory and sales information to be conveyed to a monitoring station or incorporated into environmental control systems to allow environmental condition information to be conveyed to a monitoring station. The present invention may also be used to transmit GPS data or pre-recorded message data to monitoring stations.

Although preferred embodiments of the present invention have been described, those of skill in the art will appreciate that variations and modifications may be made without departing from the spirit and scope thereof as defined by the appended claims.

What is claimed is:

1. A method of conveying the status of a device at a remote location over an Internet connection to a monitoring station comprising the steps of:
    determining the status of said device at said remote location and using the status to generate an electronic mail (e-mail) address leader;
    generating an e-mail address by appending said leader to a site address assigned to said monitoring station;
    dispatching an e-mail message to said monitoring station including said email address and a return address assigned to said remote location; and
    processing the e-mail message by examining the e-mail address leader to determine the status of said device and the return address to determine the location of said device.

2. A monitoring station to monitor the status of at least one remote site over a public switched telephone network (PSTN), said monitoring station comprising:
    a plurality of call receiving interfaces to receive calls from said at least one remote site over said PSTN and accompanying caller line identification (CLI) data generated by said PSTN, each call receiving interface having a telephone number corresponding to specific information to be conveyed from said at least one remote site to said monitoring station; and
    a processor in communication with said call receiving interfaces, said processor receiving call receiving interface identification data and CLI data in response to calls received by said call receiving interfaces to allow said processor to receive specific information from said at least one remote site and its identity without requiring said call receiving interfaces to answer the calls, wherein said at least one remote site includes at least one meter for measuring a utility consumption and storing a meter reading value and wherein selected call receiving interfaces have associated telephone numbers with digits representing digit positions and digit values of said meter reading value so that calls received by selected call receiving interfaces from said at least one remote site identify said meter reading value, said CLI data identifying the location of said at least one meter.

3. A monitoring station as defined in claim 2 wherein said at least one remote site includes a plurality of sensors, each of said sensors being assigned a unique number and wherein selected call receiving interfaces have telephone numbers incorporating the numbers of particular sensors so that calls received by each selected call receiving interface from said at least one remote site in response to sensor output, identify the sensor responsible for the calls, said CLI data identifying the location of said sensors.

4. A monitoring station as defined in claim 3 wherein said processor polls a database storing information concerning actions to be performed in response to calls received by said call receiving interfaces.

5. A monitoring station as defined in claim 4 wherein said processor is in the form of a computer, said monitoring station further including a display coupled to said computer for displaying CLI data received from said call receiving interfaces.

6. A monitoring station as defined in claim 5 wherein said display also displays the information read from said database.

7. A monitoring station as defined in claim 6 wherein said monitoring station further includes a printer coupled to said computer for printing said CLI data and information read from said database in response to calls received from said call receiving interfaces.

8. A method of monitoring the status of a device at a remote location over a public switched telephone network (PSTN) comprising the steps of:
    determining the status of said device and using the status to generate a telephone number;
    dialing said telephone number to make a call over said PSTN, said telephone number being associated with a specific call receiving interface of a monitoring station;
    dropping the call after a sufficient number of ringing signals have been received by said specific call receiving interface to ensure deliver of caller identification data to said call receiving interface by said PSTN; and
    processing the caller identification data and call receiving interface identification data to determine the location and status of said device without requiring the call to be answered, wherein said device is a meter monitoring a utility consumption and storing a meter reading value to be read by said monitoring station, at said determining step, digit positions and digit values of said meter reading value being used to complete a list of telephone numbers associated with specific call receiving interfaces, the telephone numbers in said list being dialed in succession in response to a read meter request.

9. The method of claim 8 wherein said read meter request is conveyed to said remote location by said monitoring station.

10. A system for communicating information and caller identification between entities over a public switched telephone network (PSTN) comprising:
    at least one remote site including a device whose status is to be monitored, said at least one remote site being coupled to said PSTN and being operable to make a call when the device status is to be determined; and
    a monitoring station including a plurality of call receiving interfaces coupled to said PSTN and a processor coupled to said call receiving interfaces, each call receiving interface being assigned a different telephone number corresponding to information concerning the status of said device, each call receiving interface conveying caller identification data received from said PSTN and call receiving interface identification data to said processor in response to a call received from said at least one remote site over said PSTN to allow said processor to determine the status of said device and its location without requiring said call to be answered, wherein said monitoring station further includes a plurality of call dialing interfaces coupled to said PSTN and to said processor, said call dialing interfaces being operable to call said at least one remote site over said PSTN, each of said call dialing interfaces being assigned a different telephone number at least a portion of which identifies a unique action code, caller identification data conveyed to said remote site by said PSTN in response to a call made by a call dialing interface including said action code, said at least one remote site extracting said action code from said caller identification data and processing the same.

11. A system as defined in claim 10 wherein said at least one remote site drops said call after said call receiving interface has received a sufficient number of ringing signals to ensure delivery of said caller identification data thereto by said PSTN.

12. A system as defined in 11 wherein said device is a meter for measuring a utility consumption and storing a meter reading value, wherein in response to a meter reading request, said at least one remote site uses digit positions and digit values of said meter reading value to generate a list of telephone numbers, each telephone number in said list corresponding to a telephone number assigned to a call receiving interface, said at least one remote site dialing the telephone numbers in said list to make calls to said call receiving interfaces.

13. A system as defined in claim 11 wherein said device is a vending machine.

14. A system as defined in claim 11 wherein said device is an alarm system including an alarm panel and a plurality of sensors, each of said sensors being assigned a number, wherein in response to a tripped sensor, said alarm panel uses the number assigned to said tripped sensor to complete a telephone number corresponding to a telephone number assigned to a call receiving interface, said alarm panel dialing said telephone number to make said call.

15. A system as defined in claim 11 wherein said processor polls a database storing information concerning actions to be performed in response to calls received by said call receiving interfaces.

16. A system as defined in claim 15 wherein said processor is in the form of a computer, said monitoring station further including a display coupled to said computer for displaying caller identification data received from said call receiving interfaces.

17. A system as defined in claim 16 wherein said display also displays the information read from said database.

18. A system as defined in claim 17 wherein said monitoring station further includes a printer coupled to said computer for printing said caller identification data and information read from said database in response to calls received from said call receiving interfaces.

* * * * *